United States Patent [19]

Dick et al.

[11] 4,210,932

[45] Jul. 1, 1980

[54] METHOD AND APPARATUS FOR RECORDING AND REPRODUCING ON FILM DIRECTLY VIEWABLE TV VIDEO SIGNALS

[75] Inventors: Donald E. Dick, Boulder; Robert L. Metz, Superior; Raymond D. Elliott, Denver, all of Colo.

[73] Assignee: Life Instruments Corporation, Colo.

[21] Appl. No.: 922,184

[22] Filed: Jul. 5, 1978

[51] Int. Cl.$^2$ .......................... H04N 5/84; G11B 7/00
[52] U.S. Cl. .............................. 358/130; 179/100.3 D
[58] Field of Search ............... 358/132, 130, 231, 293, 358/151; 365/127, 126; 179/100.3 R, 100.3 D, 100.3 A

[56] References Cited

U.S. PATENT DOCUMENTS

| | | | |
|---|---|---|---|
| 3,158,683 | 11/1964 | Waggener | 358/151 |
| 3,234,326 | 2/1966 | Goldmark et al. | 358/132 |
| 3,333,058 | 7/1967 | Goldmark et al. | 358/132 |
| 3,335,219 | 8/1967 | Goldmark et al. | 179/100.3 A |
| 3,448,458 | 6/1969 | Carlson et al. | 358/296 X |
| 3,465,352 | 9/1969 | Carlson et al. | 365/127 X |
| 3,501,586 | 3/1970 | Russell | 179/100.3 V |
| 3,892,914 | 7/1975 | Takayanagi et al. | 358/130 |
| 3,895,317 | 7/1975 | Burton | 358/130 X |
| 4,000,493 | 12/1976 | Spaulding et al. | 346/1 |
| 4,044,363 | 8/1977 | Morgan | 354/5 |
| 4,058,832 | 11/1977 | Vagi | 358/130 X |
| 4,133,005 | 1/1979 | Golay et al. | 358/132 |

*Primary Examiner*—Bernard Konick
*Assistant Examiner*—Donald McElheny, Jr.
*Attorney, Agent, or Firm*—Sheridan, Ross, Fields & McIntosh

[57] ABSTRACT

Method and apparatus for optically recording and reproducing video signals. The intensity of a laser beam is modulated as a function of the amplitude of the video signals. The modulated laser beam is caused to conduct a raster scan synchronized by standard TV sync pulses and used to expose photographic film. Horizontal and vertical sync bars of contrasting optical density are recorded beyond the borders of the raster. The developed film is a directly viewable reproduction of the image scanned to produce the video signals recorded. To reproduce the video signals, an unmodulated laser beam conducts a raster scan of the developed image recorded on the film. The intensity of the scanning beam is modulated by the optical density of the film and converted to amplitude modulated electrical signals, a reproduction of the video signals recorded. The optically recorded sync bars are also detected and are used to produce electrical sync pulses to position the raster scan conducted by the unmodulated beam to substantially overlie the image recorded on the film being scanned.

14 Claims, 12 Drawing Figures

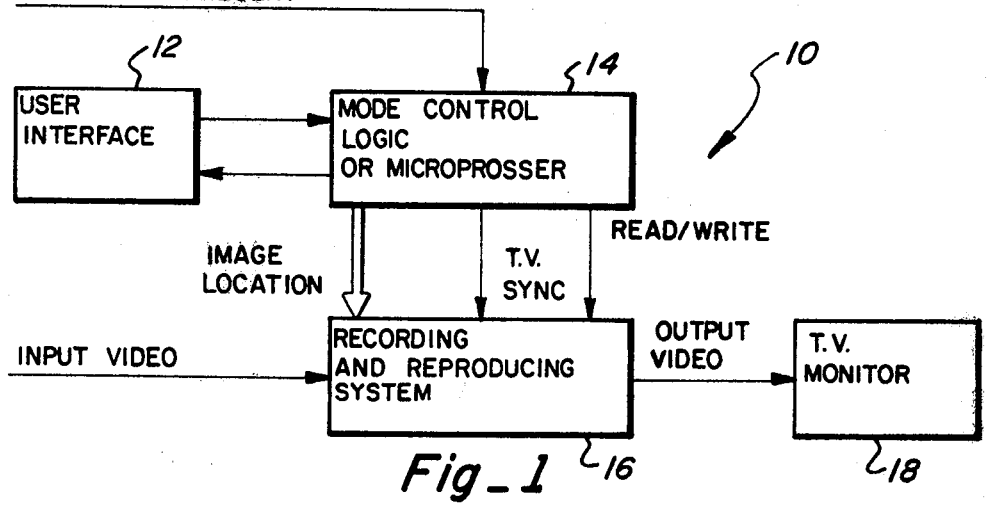
Fig_1
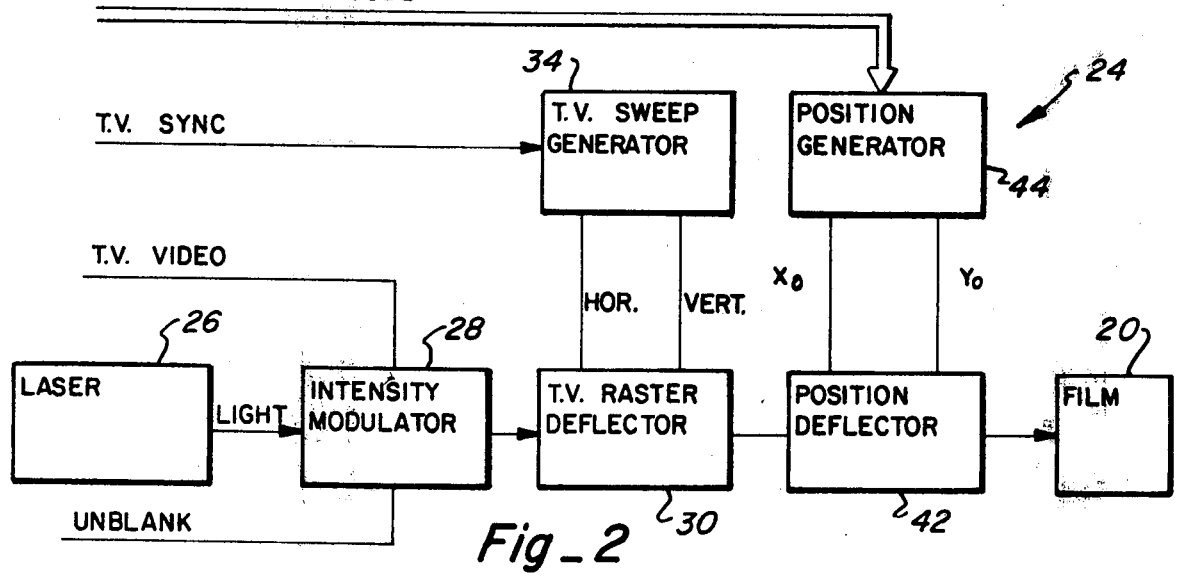
Fig_2
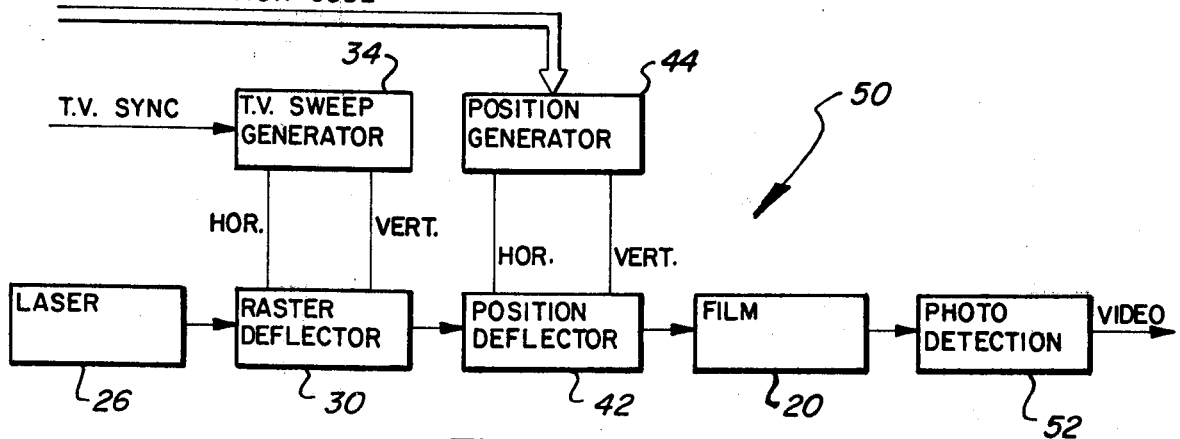
Fig.-3

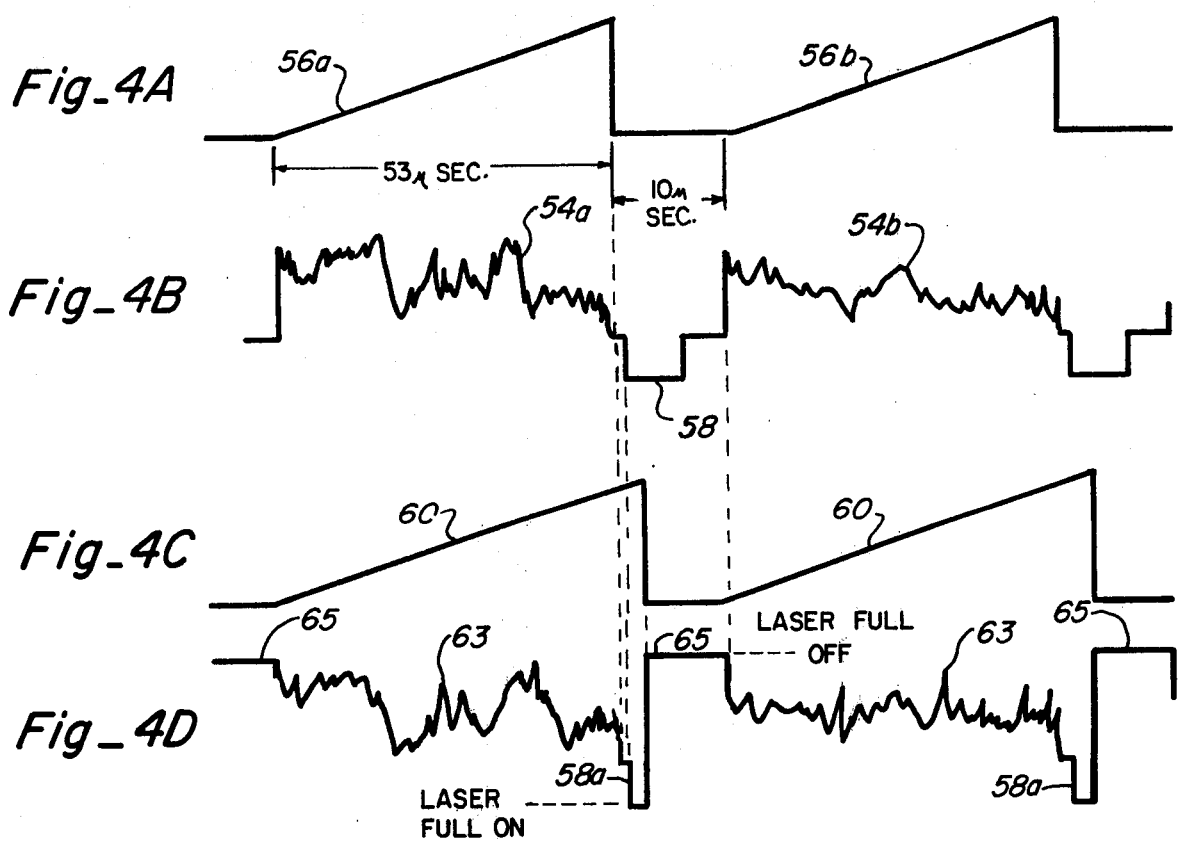
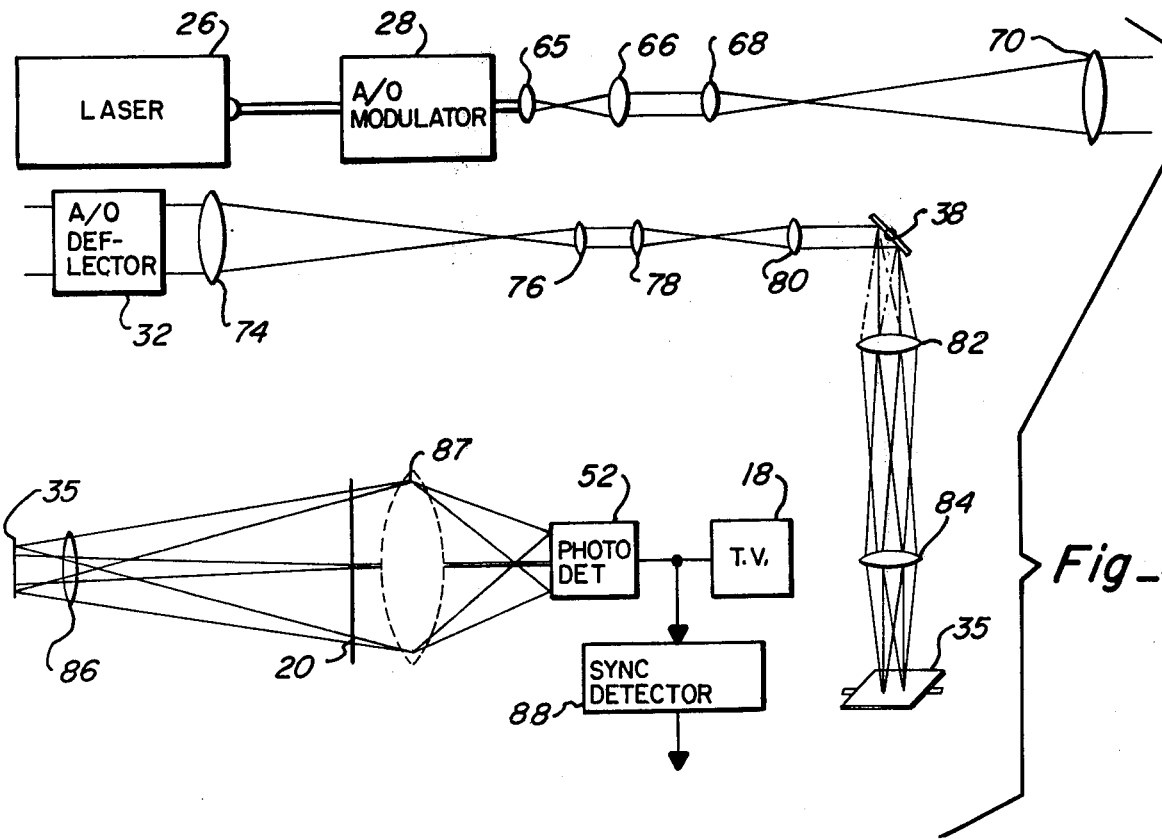

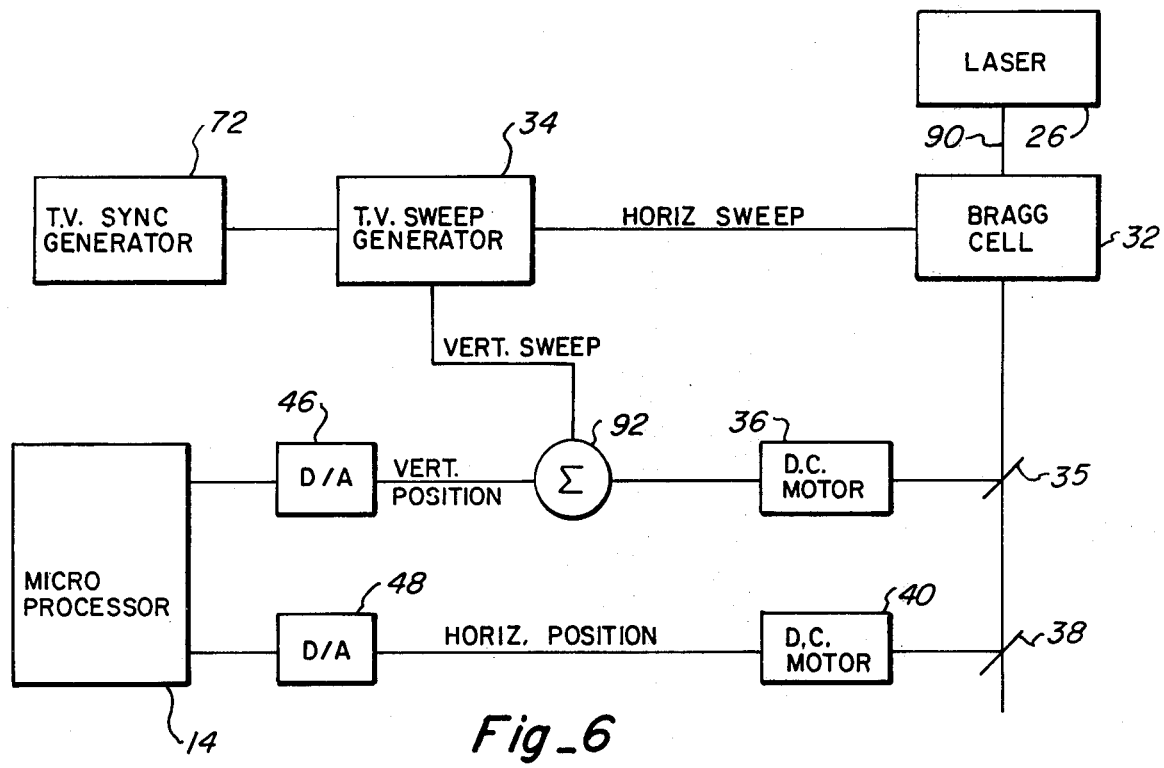
Fig_6
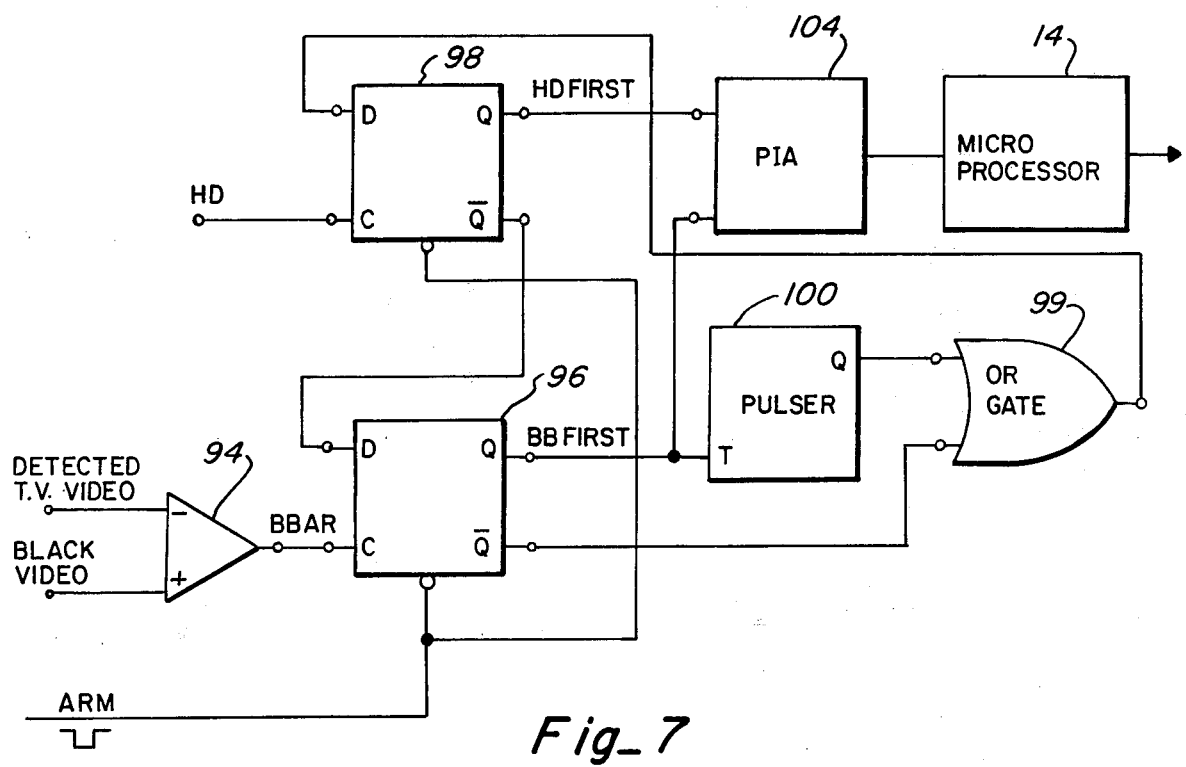
Fig_7

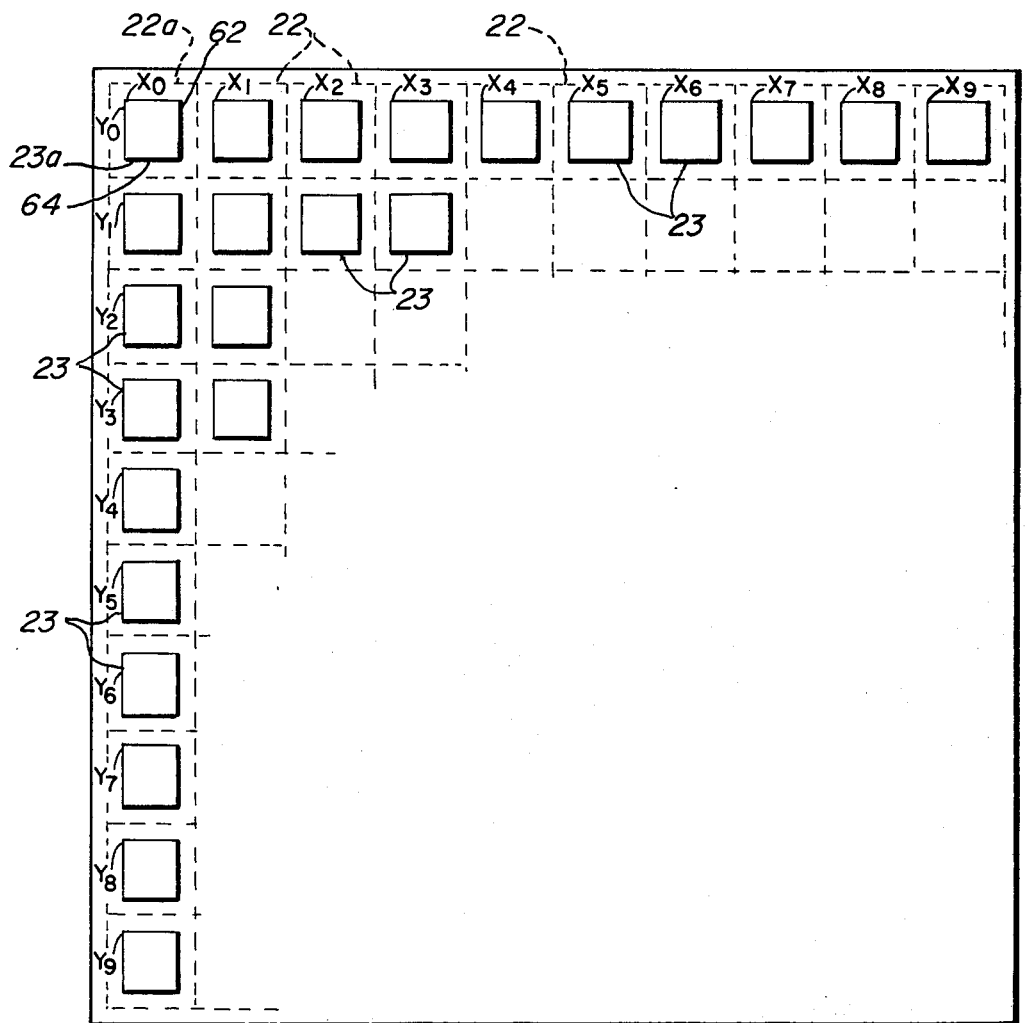
Fig_8
| HD FIRST | BB FIRST | CONCLUSION |
|---|---|---|
| 0 | 0 | CIRCUIT ARMED AND WAITING FOR TRANSITION OF EITHER SIGNAL |
| 0 | 1 | BBAR FIRST BY AT LEAST 1/2 MICRO SECOND |
| 1 | 0 | HD ARRIVES BEFORE BBAR |
| 1 | 1 | BBAR FIRST, HD FOLLOWS WITHIN 1/2 MICRO SECOND, THE DESIRED RELATIONSHIP |
Fig_9

METHOD AND APPARATUS FOR RECORDING AND REPRODUCING ON FILM DIRECTLY VIEWABLE TV VIDEO SIGNALS

BACKGROUND OF THE INVENTION

1. Field of the Invention

This invention is in the field of methods and apparatus for recording TV video signals of an image on photographic film and for reproducing the recorded TV video signals from the information recorded on the film, which information includes a directly viewable reproduction of the image.

2. Description of the Prior Art

Many types of sensing equipment produce TV video signals of images which are normally displayed by cathode ray tubes (CRT)s. Ultrasonic scanning systems used for conducting medical examinations such as the one disclosed and claimed in an application entitled "High Resolution Rotating Ultrasonic Scanner" by Robert L. Metz et al, Ser. No. 922,185, filed July 5, 1978 application is assigned to the same assignee as this invention, produce large numbers of such images for each patient examined. The abundance of such data creates problems in how to view and properly comprehend the information contained in the images. To do so effectively and efficiently requires that some or all of the images be recorded and retained for an indefinite time. Obviously there is a need to be able to reproduce any images so recorded and retained when desired and to be able to reproduce the images so recorded in any order. These problems are particularly applicable to the medical field where a physician may not be present when the images, cross-sections through an organ of a patient such as a breast, are produced by an ultrasonic scanning system or when the opinion of several specialists may be desired to confirm or establish a diagnosis. Obviously reproducible records from earlier examinations, if available, are particularly helpful in preparing a medical diagnosis as such earlier information can confirm if there has been any observable change and the nature of the change since the last examination or from any earlier examinations. The amount of information available also makes it desirable to reduce the time necessary to interpret individual cross-sectional images of an organ. One way of doing this is by displaying a set of adjacent images sequentially to create a three-dimensional image of the organ in the viewer's mind.

It is also desirable that the record on which the images are stored be compact so that the record of an examination of a patient can be stored in a relatively small space, preferably in the patient's file. It is obviously desirable that the cost of such records be minimized and that the records have the capability of reproducing images of substantially the same quality and detail as the originals when displayed on a TV monitor, for example. It is a great advantage if the records are directly viewable by appropriate optical equipment, similar to a microfiche viewer, so that the image or images so recorded can be viewed and studied other than by displaying them on a CRT of a TV monitor. The capability of being directly viewable is particularly useful in comparing current information displayed on a TV monitor for example with images of the same cross-section obtained in prior examinations.

Prior art devices for recording TV video signals have generally recorded the TV video signals on a magnetic medium such as on magnetic tape or on a magnetic disc. Such magnetic recordings and reproduction systems have the disadvantage of being relatively high in cost, and are characterized by the fact that the images recorded are not directly viewable or perceivable by the human eye or through relatively simple and low cost purely optical viewers. In addition the magnetic media on which such images are stored does not lend itself to the recording of a limited number of images nor for the filing or storing of the records of the images produced in examining one patient, for example, so that all relevant records of the patient are stored in one location and only the records of that patient are stored there.

SUMMARY OF THE INVENTION

The present invention provides both method and apparatus for recording on photographic film TV video signals of an image such as a cross-sectional view through an organ of a patient, by modulating the intensity of a laser beam with an acousto-optical modulator and by deflecting the beam so that it conducts a standard TV raster scan. The beam is focused on and positioned on the film which is fixed or nonmoving and the film when developed is a transparency. The film is divided into sectors so that a relatively large number of rasters, or images, up to 100 in a preferred example, can be optically recorded on a single piece of standard film. The apparatus will position the write laser beam so that the raster which exposes the film will be positioned in a predetermined one of the sectors of the film. Recorded in the sector with the video signals are the optical sync bars, the equivalent of the video horizontal and vertical synchronization signals or sync pulses. The optical image recorded on the film when the film is exposed by the write beam, when developed, is the equivalent of the image of the TV video signals and is directly viewable on the film. To reproduce the TV video signals from an image recorded as described above in a sector of the film, the beam of a laser of substantially constant intensity, or one which is unmodulated, is deflected so that the read beam conducts a standard TV raster scan of the image or raster recorded in a sector. The intensity of the read beam is modulated by the optical density, or transmissivity, of the image recorded on the film as well as by the sync bars of contrasting optical density. A feedback loop is provided so that the raster scan conducted by the read beam substantially coincides with the raster of the image recorded in the sector. The read laser beam after its intensity is modulated by the film is converted into electrical signals, which signals are substantially an accurate reproduction of the TV video signals used to create the image recorded in the sector. The TV video signals can be manipulated and displayed in the same manner as the original of such signals produced by an ultrasonic scanning system, for example.

It is, therefore, an object of this invention to provide method and apparatus for recording on photographic film TV video signals of an image and reproducing the TV video signals recorded on the film when needed, and in which the record on the film is an optical reproduction of the image; i.e., the scan lines of the image are substantially contiguous.

It is another object of this invention to provide method and apparatus for recording on film optical signals which are the substantial equivalent of TV video signals of images including synchronization signals in which the recorded optical signals produce a directly viewable record of the image on the film and for reproducing from such optically recorded signals TV video signals.

It is yet another object of this invention to record on film directly viewable images produced from standard TV video signals and to reproduce the standard electronic TV video signals from such images.

It is a further object of this invention to provide method and apparatus for recording on photographic film TV video signals and to reproduce the TV video signals which automatically center the scanning raster on replay so that any change in film size due to developing the film or other causes does not require the user to adjust the position of each image obtained from reroduced TV video signals during replay where the recorded image is displayed on the screen of a TV monitor so that rapid replay of recorded images is possible while maintaining each image in the center of the screen of the TV monitor.

It is another object of this invention to use a combination of an acousto-optical deflector to provide the rapid deflections required for TV horizontal sweep, and galvanometer driven mirrors to provide TV vertical sweep and the larger deflections required for recording and reproducing multiple images on photographic film without sacrificing the resolution of each individual image so recorded and reproduced.

It is also an object of this invention to reduce the time required to interpret cross-sectional images of an organ by displaying a group, or set, of such images sequentially and at an appropriate rate to create a three dimensional image of the organ in the viewer's mind.

It is a still further object of this invention to provide a compact record of TV video signals of a large number of images which can be stored in a relatively small space, is relatively economical to use, is capable of reproducing the recorded TV signals, the reproduced TV video signals having substantially the same quality as those of the original, and which is directly viewable.

BRIEF DESCRIPTION OF THE DRAWINGS

Other objects, features and advantages of the invention will be readily apparent from the following description of a preferred embodiment thereof taken in conjunction with the accompanying drawings, although variations and modifications may be effected without departing from the spirit and scope of the novel concepts of the disclosure, and in which:

FIG. 1 is a block diagram of the system of the invention;

FIG. 2 is a block diagram of the recording subsystem;

FIG. 3 is a block diagram of the reproducing subsystem;

FIG. 4 illustrates waveforms useful in describing the invention;

FIG. 5 is a schematic view of the optical subsystem of the invention.

FIG. 6 is a schematic block diagram of the components for deflecting and positioning a laser beam;

FIG. 7 is a schematic circuit diagram of a portion of the feedback circuit of the invention;

FIG. 8 is a schematic view of a film on which images have been recorded; and

FIG. 9 is a truth table describing the function of the feedback loop.

DESCRIPTION OF THE PREFERRED EMBODIMENT

In FIG. 1 recording and reproducing system 10 is provided with a user interface control panel 12 which is used by the operator of system 10 to determine or set the operating parameters for the system; for example, to place system 10 in its reproduction, or read mode; or in its record, or write mode. If system 10 is in its read mode, the operator can select which image is to be read, or reproduced, as well as the next image to be read, for example. System 10 can also be set to create sequentially and at an appropriate rate a three dimensional image in the viewer's mind of an organ or to reproduce the recorded images in substantially any manner or order that the operator desires. Mode control logic, or microprocessor, 14 interprets the operator's requests and controls the recording and replay subsystem 16 accordingly. Each time a new image is available for recording, a logic signal (new image present) is applied to mode control logic 14 from the source of the signal such as the ultrasonic scanning system referred to above. The new image present signal will cause the video signals of the image applied to recording and reproducing subsystem 16 to be recorded on photographic film 20 if system 10 is in its recording, or write, mode. The input video signals applied to recording and replay subsystem 16 are the typical or standard TV video signals such as are applied to a cathode ray tube of a conventional television set or monitor such as TV monitor 18. Recording and replay subsystem 16 includes a laser as a source of coherent monochromatic light and appropriate devices for deflecting the laser beam horizontally and vertically, as well as a device for modulating the intensity of the write laser beam. The horizontal and vertical deflections of the write laser beam are synchronized with the TV video synchronization signals to perform or conduct the standard TV raster scan in the preferred example. The intensity of the write laser beam is modulated primarily by the camera signal portion of a TV video signal. The devices or components of recording and replay subsystem 16 also have the capability of positioning the raster scanned by the write laser beam so that it is recorded in a predetermined sector of film segment 20. Film 20 in a preferred embodiment is divided into an array of 100 sectors 22 as illustrated schematically in FIG. 8, with each sector 22 having the capability of storing a raster 23 of an image by having film 20 exposed by the write beam and thereafter developed. It should be noted that during recording and reproducing of TV video signals, the position of film 20 relative to laser 26 is substantially fixed.

FIG. 2 is a block diagram of recording or write subsystem 24 of recording and reproducing subsystem 16 of system 10. An unblank signal produced by mode control logic 14 when no new image is present is used to keep the intensity of the light beam from conventional helium neon laser 26 that produces a continuous beam of coherent monochromatic light of substantially uniform or constant intensity that may reach film 20 below the threshold necessary for writing or exposing film 20. Intensity modulator 28 and TV raster deflector 30 are preferably acousto-optical devices (Bragg cells), devices in which ultrasonic standing waves are used to modulate the intensity of the write beam produced by laser 26 or to deflect the beam as is well known in the art. While one Bragg cell can both deflect a laser beam to provide horizontal sweep and to modulate the intensity of the beam passing through the cell, in the preferred embodiment intensity modulator 28 and horizontal deflector 32, seen in FIG. 6, are separate devices. The intensity of the write laser beam after passing through modulator 28 is determined by the amplitude of the standing acoustic waves in modulator 28. The write beam is deflected to conduct a standard TV raster scan, in the preferred embodiment, by raster deflector 30 in response to horizontal and vertical scanning waves produced by conventional TV sweep generator 34 in response to the TV sync signals applied to it which synchronization signals are stripped, or separated, from the standard TV video signals. The horizontal deflection of the raster scan is produced by acousto-optical horizontal deflector 32 and is a functon of the frequency of the standing waves in deflector 32. Vertical scan, or deflection, of the writing beam to produce the raster scan is accomplished by vertical mirror deflector 35 which is positioned by a small dc motor 36 of a conventional galvanometer. While the vertical sweep could be performed by an acousto-optical cell, the use of a motor driven mirror to provide the slower vertical scan has the advantage of reducing the cost of system 10.

Motor 36 and mirror 35 and horizontal mirror deflector 38 and dc motor 40 of a second conventional galvanometer are components of position deflector 42. Position generator 44 provides signals $X_0$, $Y_0$ which are the coordinates of the origin of raster 23a, for example, on film 20 where raster 23a is to be recorded. In the Y, or vertical, direction both the vertical sweep associated with a TV raster scan, and the positioning of the raster on film 20 is accomplished by motor 36 and vertical mirror deflector 35, as will be explained later. Position generator 44 is, in the preferred embodiment, a pair of digital to analog converters (D/A) 46, 48 that convert an image selector digital code from control logic 14 into analog voltages corresponding to the coordinates $X_0$ and $Y_0$ that drive motors 36, 40 to position raster 23 in sector 22a of film 20.

When an image recorded on film 20 is to be reproduced or converted into video signals, the read, or reproducing subsystem, 50 of recording and reproducing subsystem 16 of system 10 which is illustrated in FIG. 3 is utilized. In the read, or replay, mode the intensity of the light beam from laser 26 is not modulated by modulator 28 except during retrace when essentially no light from laser 26 is permitted to pass through modulator 28 in the preferred embodiment. TV sweep generator 34 in response to standard TV synchronization signals, or sync pulses, causes the read laser beam to be deflected to conduct a standard TV raster scan by raster deflector 30 with the fast horizontal sweep provided by horizontal deflector 32 and the vertical sweep by mirror 35. Position generator 44 will cause raster 23 scanned by the read beam to substantially coincide with the raster of an image recorded in a sector 22 as the result of position generator 44 supplying $X_0$, $Y_0$ coordinates of the origin of the raster to position deflector 42. The amount of the scanning read beam passing through raster 23 is measured by photodetector 52 which produces electrical signals which are a function of the film density scanned by the read laser beam. The output of detector 52 is a standard TV video signal which can be used in the conventional way to produce an image on a CRT of a TV monitor.

Any change in the dimension of film 20 as a function of time, or any change in position between the time data, images are recorded on film 20 and when film 20 is positioned to be read to reproduce the recorded TV signals can result in the raster scan conducted by the read beam not substantially coinciding with the raster photographically recorded in a sector 22 of film 20. It is therefore necessary to provide some form of feedback so that the raster scan conducted by the read beam coincides with, or is congruent with, the raster of the recorded image. To provide appropriate feedback, TV synchronization signals, or sync pulses, are recorded in the sector of film 20 during the time a raster 23 is being recorded by a write laser beam in the sector.

To do this the horizontal scanning wave or horizontal sweep is extended so that it is longer than usual. Referring to FIG. 4, in FIG. 4A the normal, or standard horizontal scanning wave or sweep which is not to scale is illustrated. The time between the beginning of horizontal sweep 56a and its end is substantially 53 microseconds. The period between sweeps is approximately 10 microseconds to permit flyback. In FIG. 4B typical video signals are illustrated. The video, or camera, signals 54 used to modulate the intensity of an electron beam in a CRT, for example, essentially terminate at the end of each horizontal sweep 56. There is a 1.3 microsecond period between the end of the video signal 54 and the beginning of horizontal sync pulse 58 which is 5 microseconds in width and approximately 3.7 microseconds until the video signal 54b appears, at which time the horizontal sweep 56b begins as can be seen by comparing FIGS. 4A and 4B.

To record synchronization information on film 20, a portion 58a, illustrated in FIG. 4D of the horizontal sync signal 58 is used to modulate the intensity of the laser beam produced by laser 26. This is accomplished by extending the horizontal sweep 60 as illustrated in FIG. 4C so that a portion 58a of sync pulse 58 can be applied to modulator 28 so that the intensity of the write laser beam which passes through modulator 28 is substantially at its maximum intensity which results, in the preferred embodiment, in a horizontal black sync bar 62 being written, or recorded, on the right-hand border of the raster of each image recorded in each sector 22 of film 20. During flyblack the video, or camera, signal 63 applied to modulator 28, which is illustrated in FIG. 4D has a value such that in the preferred embodiment essentially no light from laser 26 passes through modulator 28, or to describe it another way, camera signal 63 includes a blanking pulse 65 which is applied to modulator 28 during flyback. Sync bar 62 will in the preferred embodiment be blacker than the normal video black level and will extend into the nonlinear region of the gamma curve of film 20. During a read, the video signals produced by photodetector 52 will include an abbreviated sync pulse produced when the intensity of the read beam is modulated by a black sync bar 62, for example. The sync pulses can be detected and the image location code produced by microprocessor 14 can be modified to change the position of the scanning raster by causing the horizontal mirror deflector 38 to move so that the horizontal sync pulses detected by photodetector 52 occur at the proper time with respect to the horizontal sync pulses applied to TV sweep generator 34 as will be described later.

A similar technique can be used to cause a black vertical sync bar 64 to be recorded at the bottom of each raster 23 of the image recorded in each sector 22 by causing the lower or bottom three horizontal scan lines of the raster to have voltages corresponding to the vertical sync pulses applied to modulator 28 so that a heavy black bar 64 will be written on the bottom border of the raster 23 of each image which vertical black sync bar 64 can be detected and used to modify the position of the vertical deflector mirror 38 by causing microprocessor 14 to change the vertical address or location applied to the position generator 44 until the vertical sync pulses applied to the TV sweep generator 34 and those detected by photodetector 52 are occurring at the right times.

Referring to FIG. 5, the output of laser 26 is a narrow beam of coherent monochromatic light that is approximately 0.8 millimeters in diameter. This beam is essentially stationary and of substantially constant intensity. The output beam of laser 26 passes through the acousto-optical modulator 28. TV video signals 63 during write mode are applied to acousto-optical modulator 28 to vary the intensity of the beam transmitted through modulator 28 as a function of the amplitude of the video signals applied thereto. Modulator 28 is turned off so that the full intensity of laser beam from laser 26 passes through it when system 10 is in its read mode except during flyback when modulator 28 is energized to essentially prevent light from laser 26 reaching photodetector 52. The output of modulator 28 is a narrow beam of light that is unmodulated except during flyback as described above during the read mode of system 10 and is modulated by TV video signals 63 during the write mode of system 10. The beam is spread out by lenses 65 and 66 to a cylindrical beam approximately 1.6 millimeters in diameter. That beam then passes through cylindrical lens 68 and is spread out into a beam of light that is approximately 40 millimeters wide and 1.6 millimeters high. The beam is recollimated in the X, or horizontal plane and focused in the Y, or vertical plane by lens 70. The beam from lens 70 which is still stationary then enters acousto-optical deflector 32. Deflector 32 has applied to it horizontal sweep or scanning waves produced by raster generator 34 in response to sychronization signals from TV sync generator 72. The output of horizontal deflector 32 is a sheet of light which is approximately 40 millimeters wide and somewhat less than 1.6 millimeters high in a preferred embodiment and which beam has been deflected through a small angle. As a result the laser beam is deflected horizontally to perform the horizontal sweep of the standard TV raster scan. The beam of light after leaving deflector 32 is reformed through lens 74 and cylindrical lens 76 into a cylindrical collimated beam of light again approximately 1.6 millimeters in diameter. This beam of light after passing through lens 76 contains intensity information during the write mode, is sweeping in the horizontal or X direction, and is stationary in the vertical or Y direction. The beam is again enlarged by lenses 78, 80 into a circular beam of light 6.3 millimeters in diameter. This beam of light sweeps only in the horizontal direction and is deflected at the horizontal sweep rate of the standard TV raster. The beam of light is then deflected by mirror 38 which positions the raster horizontally and in the preferred embodiment will deflect the beam of light through an angle of approximately 8 degrees depending upon the angle of mirror 38. Motor 40 positions mirror 38 and is controlled by digital numbers, twelve bits in the preferred embodiment, which are applied by microprocessor 14 to D/A converter 48 which converts the binary signals, or numbers, to corresponding dc voltages to properly position mirror 38. Lenses 82, 84 serve to reimage the signals from horizontal deflector mirror 38 onto the vertical deflector mirror 35. Light reflected from mirror 35 which is positioned by dc motor 36, a typical galvanometer, is directed straight up out of the horizontal plane in which all of the optical elements preceding, or before mirror 35, are located; and is thus swept in two directions, horizontally and vertically. The laser beam after being reflected by the vertical mirror deflector 35 as illustrated in FIG. 5 is focused onto film 20 by lens 86 to expose the film, which film when developed is a substantially permanent record of the images so recorded.

As seen in FIG. 8, film 20 is divided into an array of sectors 22, 10 in each column or row, for a total of 100 in a preferred embodiment. In the preferred embodiment, each image or raster 23 recorded in sector 22 is approximately 6½ millimeters wide and has a ¼ millimeter border which provide a total of 10 sectors in 70 millimeters, the width of the film. The vertical dimensions of the rasters 23 are also 6½ millimeters high with a ¼ millimeter border to provide 10 sectors in the 70 millimeters of film 20 available vertically. A suitable type of film for use in recording and reproducing system 10 is Kodak High Speed Holographic film type SO-253, a product of the Eastman Kodak Co.

In the preferred embodiment, film 20 when developed produces a transparency on which the image whose TV signals are recorded in a sector of the film by the apparatus and method of this invention is directly viewable and preferably has the same contrast or appearance when directly viewed as when the same image is produced on a black and white TV monitor for example, by applying the TV video signals of the image to the monitor. It is within the scope of this invention to use film which when exposed and developed is either a positive or negative transparency and to appropriately modulate the intensity of the write laser beam to produce a directly viewable record of the image having substantially the same appearance as that produced by a TV monitor.

In the read mode a piece of exposed and developed film 20 is placed as illustrated in FIG. 5. The read beam from laser 26 is positioned by position generator 44 and position deflector 42 so that the read beam scans a raster 23 of an image recorded in a sector 22 of film 20 and has its intensity modulated by the transmissivity, or optical density, of the recorded raster 23. The intensity modulated read beam is focused by lens 87 onto photodetector 52. The output of photodetector 52 is a video signal which when combined with synchronization signals can be applied to standard TV monitor 18 for the production of an image by the typical CRT of TV monitor 18. The electrical output signals of photodetector 52 are also applied to a standard sync detector 88 to detect the location of the sync bars 60, 62 recorded on a raster 23 of an image on film 20. The output of sync detector 88 is applied to the feedback circuit illustrated in FIG. 7.

In FIG. 6, the components that deflect laser beam 90 produced by laser 26 so that it conducts a standard TV raster scan and which will position the raster so that it can be recorded in a predetermined sector, such as sector 22a, of film 20 which is schematically illustrated in FIG. 8. Conventional TV sync generator 72 produces the synchronization signals, or sync pulses, having the characteristics of standard TV sync pulses. These sync pulses are applied to TV sweep generator 34 which produces horizontal and vertical scanning waves, or sweep signals. Beam 90 from laser 26 after passing through modulator 28 which does not modulate laser beam 90 except on flyback and is therefore not illustrated in FIG. 6, passes through Bragg cell 32 which will deflect beam 90 horizontally as described above as a function of the horizontal sweep signal applied to it so that the beam of light from laser 26 will conduct a horizontal linear sweep in synchronization with the horizontal sweep signals produced by generator 34. The positioning of a raster 23 in a sector 22 is controlled by microprocessor 14 which provides the "X" and "Y" coordinates of the origin of the raster 23a, for example, as 12 bit binary numbers which are converted to dc voltages by D/A converters 46, 48. The voltage from D/A converter 46 has added to it the vertical sweep wave form produced by TV sweep generator 34 which voltages are combined by summing amplifier 92. The output of amplifier 92 is applied to dc motor 36 to control the position of vertical mirror deflector 35. The X or horizontal position of the raster scanned by beam 90 is controlled by microprocessor 14 by providing the location of the X coordinate of the origin of the raster 23a, for example, as a 12 bit binary number in the preferred embodiment, which origin is located in the sector 22a in which the raster 23a is to be recorded. In response to the binary numbers applied to it D/A converter 48 produces a dc output which will cause dc motor 40 to position horizontal mirror deflector 38 to deflect beam 90 so that it is properly positioned to scan raster 23a in sector 22a, for example.

As mentioned before, the possibility exists of changes in the dimensions of film 20 or in its position so that it is necessary to provide feedback so that the raster 23 scanned by beam 90 as determined by the sweep signals of generator 34 and the positioning signals from microprocessor 14 during the read mode of system 10 will be properly positioned to overlie, and be congruent with, the recorded raster 23. To provide such feedback control, the output of sync detector 88, which is illustrated in FIG. 5, is applied to the negative input terminal of comparator 94 illustrated in FIG. 7. The positive terminal of comparator 94 has applied to it a voltage corresponding to the black video level which is approximately 0.0 volts in a preferred embodiment. The signal BBAR, the output of comparator 94, will go positive, or be a logical 1, when the output of sync detector 88 corresponds to one of the black sync bars 62, 64 on the right or bottom sides of a raster 23. The signal BBAR is applied to the clock input terminal C of BBFIRST flip-flop 96 and the horizontal drive signal or sync pulse HD is applied to the clock terminal C of HDFIRST flip-flop 98. Both flip-flops 96 and 98 are standard delay type flip-flops. The ARM signal a negative pulse, or a logical "0", initially resets both flip-flops 96, 98 since the ARM signal, which is produced by microprocessor 14, when programmed to do so, is applied to the reset terminals of flip-flops 96, 98. When flip-flop 96 resets the output of terminal $\bar{Q}$ of flip-flop 96, a logical 1 is applied through or gate 99 to the D terminal of flip-flop 98, and the output of the $\bar{Q}$ terminal of flip-flop 98 which is also a logical 1 is applied to the D terminal of flip-flop 96. The first signal BBAR or HD to have a 0 to 1 transition sets the corresponding flip-flop HDFIRST 98 or BBFIRST flip-flop 96. If HDFIRST is set first, its output at the output terminal $\bar{Q}$ goes low so that a following BBAR pulse will not set flip-flop 96. If flip-flop 96 is set first, it triggers the one-half microsecond pulser 100 which produces a logical 1 at its Q output terminal for ½ microsecond, which logical 1 is applied to the input terminal D of flip-flop 98. If the horizontal drive HD pulse occurs within the half microsecond interval following the production of BBAR, then flip-flop 98 will also set. If the horizontal drive sync pulse occurs later than this, a logical 0 is applied to terminal D of flip-flop 98 through or gate 99 and flip-flop 98 will no longer set.

The two signals HDFIRST and BBFIRST are applied to microprocessor 14 through a commercially available programmable interface 104 (PIA). Microprocessor 14 will interpret the signals according to the table set forth in FIG. 9. The desired result is for the signal BBAR to come first with the horizontal drive pulse HD following BBAR within a half microsecond. Using the truth table of FIG. 9, the binary numbers applied to D/A converter 48 is incremented or decremented by microprocessor 14 which causes DC motor 40 for example to change the position of mirror 38 until such time as the desired relationship between BBAR and HD is achieved.

The vertical feedback circuit which positions the scanning raster vertically during the read mode is substantially the same as the circuit illustrated in FIG. 7 except that it uses the vertical drive pulses VD from sync generator 72 instead of HD pulses and a similar BBAR signal produced by a comparator 94 when sync detector 88 detects a vertical sync bar 64 of a raster as the raster is scanned by the read laser beam. The pulser for the vertical feedback circuit provides a 150 microsecond pulse instead of the half microsecond pulse provided by pulser 100 for horizontal synchronization. Thus the circuit illustrated in FIG. 7 and a similar circuit for the vertical synchronization, provides feedback control of the X or horizontal position of the scanning raster and feedback control for the Y or vertical position so that the location of the raster during the read mode scanned by laser beam 90 can be adjusted by appropriate modifications of the signals applied to the A/D converters 46, 48 by microprocessor 14 with the result that the scanning read raster conducted by laser beam 90 substantially coincides with the recorded raster 23 on film 20. The feedback circuits permit the scanning raster on replay, or read, to center quickly and accurately on the recorded raster so that there is no need for the user, or operator, to adjust the position of each image as reproduced on a TV monitor for example. As a result, rapid replay of recorded images is possible while maintaining each image in the center of the TV screen.

From the foregoing, it is believed apparent that it is obvious that Applicants have provided apparatus for recording on photographic film TV video signals of an image that can be viewed directly and which images can be scanned by a beam of light to reproduce the recorded TV video signals. The film record 20 is small, relatively inexpensive, and can be stored substantially indefinitely in the patient's records. A big advantage of the system of the invention is that it reduces the time necessary to interpret the individual cross-sectional images of an organ in conducting medical screening and diagnosis by displaying a group or set of images sequentially and at an appropriate rate to create effectively a three-dimensional image in the viewer's mind. Such an effect is accomplished by having the last image displayed in a sequence immediately following the next to last rather than starting over with the first image. This eliminates interruptions in the continuity of the organ as perceived by the viewer and thus the system enhances the ability of a physician to recognize abnormalities, for example.

It should be evident that various modifications can be made to the described embodiment without departing from the scope of the present invention.

We claim as our invention:

1. A method of recording TV video signals having camera signals and sync signals of rasters of images on film and reproducing the TV video signals from the recording of the rasters, comprising the steps of:

producing a write beam of coherent light of substantial constant intensity from a source;

modulating the intensity of the write beam as a function of the amplitude of the camera signals of each of the rasters to be recorded:

deflecting the intensity modulated write beam to cause the write beam to conduct a TV raster scan for each of the images to be recorded;

focusing the write beam onto a nonmoving photographic film to expose the film, the film when developed producing a photographic record of the rasters, each of said photographic rasters being a directly viewable reproduction of an image, said photographic film having a plurality of sectors forming an array, the size of each sector being such that a raster scan is conducted by the beam in each of the sectors so that an image is recorded in each sector, the position of the photographic film being fixed relative to the source of the beam during the recording and reproducing of the TV video signals in each of the sectors, the photographic film also being fixed relative to the beam source during the positioning of the beam from each of the sectors to the next predetermined sectors on which a raster scan is to be conducted;

the reproducing of the TV video signals from the developed photographic record of the rasters, comprising the steps of:

producing a scanning beam of coherent light of substantially constant intensity;

deflecting the unmodulated scanning beam to cause the beam to conduct a raster scan of the photographic record of each of the rasters recorded on the nonmoving film, the intensity of the scanning beam being modulated by the transmissivity of the film; and converting the intensity modulated scanning beam into amplitude modulated electrical signals, said electrical signals being a substantial reproduction of the TV video signals of each of the rasters recorded on the film.

2. A system for recording video signals of rasters of two-dimensional images on photographic film the position of which remains fixed during recording which film when developed is a photographic transparency record of the images and for reproducing from the transparency the position of which remains fixed during reproduction of the video signals of the rasters recorded on the film, comprising:

means for recording on the film by exposing a portion of the film to an intensity modulated write laser beam conducting a TV raster scan, the modulation of the intensity of the write beam being a function of the video signals of each of the rasters of the images to be recorded and synchronization information, said film when developed being a directly viewable transparency record of said two-dimensional images, said film having a plurality of sectors forming an array, the size of each sector being such that a raster scan is conducted by the laser beam in each of the sectors so that an image is recorded in each sector, the position of the film being fixed relative to the laser during the recording and reproducing of the video signals in each of the sectors, the film also being fixed relative to the laser during the positioning of the beam from each of the sectors to the next predetermined sectors on which a raster scan is to be conducted;

means for reproducing the video signals of the rasters of two-dimensional images on the photographic transparency by scanning each of the images with an unmodulated read laser beam conducting a TV raster scan of each of the images to modulate the intensity of the read laser beam;

means for converting the intensity modulated read laser beam into electrical signals, said signals being a substantial reproduction of the video signals modulating the intensity of the write laser beam to produce the optical images of the transparency;

means for sensing the synchronization of information of the scanned images to produce control signals; and feedback means responsive to said control signals for positioning the read laser beam so that the raster scan conducted by the read laser beam is substantially congruent with each of the recorded images.

3. A system for recording on nonmoving photographic film TV video signals having camera and sync signals of rasters of images from a source and reproducing from the information recorded on the film when developed TV video signals of the rasters of the images comprising:

a laser producing a laser beam;

modulating means for modulating the intensity of the laser beam, said modulating means adapted to be connected to a source of TV video signals, said modulating means modulating the intensity of the laser beam as a function of the amplitude of the camera signals;

scanning means for causing the intensity modulated laser beam to conduct a raster scan, said scanning means adapted to be connected to the source of TV video signals;

photographic film having a plurality of sectors forming an array, the size of each sector being such that a raster scan conducted by the intensity modulated laser beam can be recorded therein, the position of the film being fixed relative to the laser during the recording and reproducing of TV video signals, the position of the photographic film being fixed relative to the source of the beam during the recording and reproduction of the TV video signals in each of the sectors, the photographic film also being fixed relative to the beam source during the positioning of the beam from each of the sectors to the next predetermined sectors on which a raster scan is to be conducted;

positioning means for positioning the intensity modulated laser beam on the film so that the raster scan conducted by it is positioned in a given sector of the film, whereby a raster image is photographically recorded on the film within each of said sectors;

and a reproducing system for images recorded by the recording system including:

said laser;

said scanning means;

developed photographic film having a plurality of sectors forming an array and having an optical image recorded in the form of a raster by the recording means in each of said sectors;

said postioning means positioning the unmodulated light beam of the laser so that the beam conducts a raster scan of each of the images in each of the sectors, the intensity of the beam scanning the image being modulated by the transmissivity of the film; the means for converting the intensity modulated beam of light to electrical TV video signals adapted to be applied to a TV monitor to reproduce each of the images.

4. A system for recording on a nonmoving photographic transparency optical signals derived from electrical TV video signals of rasters of images and reproducing from the rasters recorded on the transparency TV video signals of the rasters of the images, comprising:

laser means for producing a laser beam of substantially constant intensity;

modulating means for modulating the intensity of the laser beam as functions of the amplitude of the camera and synchronization signals of the video signal of each of the rasters to be recorded;

scanning means for causing the intensity modulated laser beam from the modulating means to conduct a TV raster scan for recording each of the images;

film means fixedly mounted with respect to the laser means and having a plurality of sectors forming an array, the size of each sector being such that the raster scan conducted by said intensity modulated laser beam can be recorded therein, said film means being fixed relative to said laser means during the positioning of the laser beam from each of the sectors to the next predetermined sectors on which a raster scan is to be conducted;

positioning means for positioning the intensity modulated laser beam on the film so that the raster is positioned in a given sector to expose the film, said film when developed producing a photographic transparency on which is recorded the images and said synchronization signals;

and a reproducing system including;

said laser means;

said scanning means for causing the laser beam to conduct a TV raster scan for reproducing each of the images;

a photographic transparency having a raster of an image recorded in said sectors by the recording system the position of the photographic transparency relative to the laser means being substantially fixed during the reproducing of the TV video signals and during the positioning of the laser beam from each of the sectors to the next predetermined sectors on which a raster scan is to be conducted;

said positioning means positioning the unmodulated laser beam so that the beam conducts a raster scan of the images recorded in each of the predetermined sectors, the intensity of the beam scanning each of the images being modulated by the transmissivity of the transparency;

detector means for converting the intensity modulated beam of light to electrical TV video signals adapted to be applied to a TV monitor to produce a directly viewable reproduction of each of the images, said signals including synchronization signals; and feedback means responsive to the synchronization signals produced by the detector means for controlling the positioning means so that the scan conducted by the unmodulated laser beam substantially overlies each of the rasters recorded on the transparency in a predetermined sequence.

5. A method of recording electrical TV video signals of rasters of images on sectors of a nonmoving photographic film and reproducing the TV video signals of the images, comprising the steps of:

producing a write laser beam of substantially constant intensity from a source;

modulating the intensity of the write laser beam as a function of the amplitude of TV video signals of the raster of each of the images to be recorded;

conducting a TV raster scan with the intensity modulated write laser beam of each of the sectors of the film forming an array to record the rasters of the images and synchronization information on the sectors, each of the recorded rasters being a directly viewable reproduction of an image, the position of the photographic film being fixed relative to the beam source during the recording and reproducing of the TV video signals in each of the sectors, the photographic film also being fixed relative to the beam source during the positioning of the beam from each of the sectors to the next predetermined sectors on which a raster scan is to be conducted;

producing a read laser beam of substantially constant intensity;

conducting a TV raster scan with the read laser beam of each of the sectors of a film on which has been optically recorded the rasters of images, the intensity of the read laser beam being modulated by the transmissivity of the film being scanned by the read laser beam; and converting the intensity modulated read laser beam into amplitude modulated electrical signals, said electrical signals being a substantial reproduction of the electrical TV video signals of the rasters of the images and synchronization signals of the images recorded on the film.

6. A system for recording on photographic film TV video signals of rasters of images and the synchronization signals of the rasters, comprising:

a recording system including:

laser means for producing a write laser beam of substantially constant intensity;

modulating means for modulating the intensity of the write laser beam as a function of the video signals of each of the rasters of an image to be recorded including at least a portion of the horizontal sync pulses and vertical sync pulses of said video signals to produce an intensity modulated write laser beam;

scanning means for causing the write laser beam to conduct a raster scan; and film means having a plurality of sectors forming an array, the size of the sectors being such that a raster scan conducted by the write laser beam can be optically recorded within a sector and is a directly viewable reproduction of said image with a portion of the horizontal sync pulse for each horizontal sweep of the write laser beam being recorded at one border of the raster as a horizontal sync bar of contrasting optical density and with a portion of the vertical sync pulse for each vertical sweep of the write laser beam being recorded at another border of the raster as a vertical sync bar of contrasting optical density;

means for mounting the film means so that the position of the film means with respect to the laser means is substantially fixed during the recording of the video signals in each of said sectors and during the positioning of said laser beam from each of said sectors to the next predetermined sectors on which a raster scan is to be conducted; and positioning means for positioning the intensity modulated write laser beam so that the raster scan conducted by the beam is within a predetermined sector of the film means;

the reproducing system for optical images recorded by the recording system on developed photographic film including:

said laser means for producing a read laser beam of substantially constant intensity;

said scanning means for causing the read laser beam to conduct a raster scan;

means for mounting the film so that its position with respect to the laser means is substantially fixed during the reproducing of the video signals in each of the sectors and during the positioning of the beam from each of the sectors to the next predetermined sectors on which a rasters scan is to be conducted and the read laser beam can conduct a raster scan of an image recorded in each of the sectors of the film;

said positioning means positioning the unmodulated read laser beam so that the scan conducted by the read laser beam is substantially within each of the sectors in which the raster of an image is recorded in a predetermined sequence;

the intensity of the read laser beam being modulated by the optical density of the image recorded in each of the sectors;

detector means for converting the intensity modulated read laser beam to electrical signals;

means for sensing the horizontal sync pulses and vertical sync pulses produced by the detector means; and feedback means responsive to the horizontal and vertical sync pulses for accurately positioning the positioning means so that the raster scan conducted by the read laser beam is substantially congruent with the recorded raster in each of said sectors.

7. A system as defined in claim 6 in which the portion of the horizontal sync pulse is recorded at the right-hand side of the raster and a portion of the vertical sync pulse is recorded at the bottom side of the raster.

8. A system as defined in claim 7 in which the optical density of the horizontal and vertical sync bars is the maximum optical density of the film.

9. A system as defined in claim 6 in which the detector means includes a photodetector.

10. A system for recording on photographic film TV video signals of rasters of images, comprising:

laser means for producing a laser write beam of substantially constant intensity;

acousto-optical modulating means for modulating the intensity of the write laser beam as a function of the amplitude of the TV video signals to produce an intensity modulated write laser beam;

scanning means responsive to the synchronization signals of the TV video signals for causing the write laser beam to conduct a standard TV raster scan for recording the images;

film means having a plurality of sectors forming an array, the size of the sectors being such that a raster scan conducted by the write laser beam can be optically recorded within a sector of the film means and a portion of the horizontal sync pulse for each horizontal sweep of the write laser beam is recorded on the right border of the raster as a horizontal sync bar of contrasting optical density and a portion of the vertical sync pulse of each vertical sweep of the read laser beam is recorded at the bottom border of the raster as a vertical sync bar of contrasting optical density, the position of the film means relative to the laser means being substantially fixed during the recording of the TV video signals in each of the sectors, said film means also being fixed relative to the laser means during the positioning of the laser beam from each of the sectors to the next predetermined sectors on which a raster scan is to be conducted; and positioning means for positioning the write laser beam so that the raster scan conducted by the write laser beam is within a predetermined sector of the film means;

and a reproducing system of optical images recorded by the recording system on photographic film including:

said laser means for producing a laser read beam of substantially constant intensity;

said scanning means for causing the read laser beam to conduct a standard TV raster scan for reproducing the images;

means for mounting the film means so that the read laser beam conducts a raster scan of an image recorded in a predetermined sector of the film and so that the position of said film means relative to the laser means is substantially fixed during the reproducing of the TV video signals in each of the sectors, said film means also being fixed relative to the laser means during the positioning of the laser beam from each of the sectors to the next predetermined sectors on which a raster scan is to be conducted;

said positioning means positioning the read laser beam so that the scan conducted by the read laser beam substantially overlies each of the rasters photographically recorded in each of the sectors in a predetermined sequence;

the intensity of the read laser beam being modulated by the transmissivity of the optical record of each of the rasters of the images recorded in each of the predetermined sectors;

means for converting the intensity modulated write laser beam to electrical signals;

sync detector means for sensing the pulses produced by the scanning of the horizontal and vertical sync bars recorded with each of the rasters and producing horizontal and vertical sync pulses; and feedback means responsive to the horizontal and vertical sync pulses produced by the sync detector means for causing the positioning means to position the raster scan conducted by the read laser beam so that said raster scan is substantially congruent with each of the recorded rasters.

11. The system of claim 10 in which the film means when developed is a transparency on which the raster is optically recorded, said raster being directly viewable and a reproduction of the image corresponding to the image produced by the TV signals modulating the intensity of the write laser beam if said signals are applied to a TV monitor.

12. The system of claim 10 in which the optical density of the horizontal and vertical sync bars is substantially the maximum optical density of the developed film.

13. A method of recording video signals of rasters of two-dimensional images from a source on photographic film and for reproducing the video signals recorded on the film, comprising the steps of:

recording on the nonmoving film the rasters of the two-dimensional images by modulating the intensity of a beam of light from a source as a function of the amplitude of the video signals and causing said intensity modulated beam of light to conduct a TV raster scan of each of the sectors of the film to expose the film which when developed produces a directly viewable reproduction of the images, said photographic film having a plurality of sectors forming an array, the size of each sector being such that a raster scan is conducted by the beam in each of the sectors so that an image is recorded in each sector, the position of the photographic film being fixed relative to the source of the beam during the recording and reproducing of the TV video signals in each of the sectors, the photographic film also being fixed relative to the beam source during the positioning of the beam from each of the sectors to the next predetermined sectors on which a raster scan is to be conducted;

recording on the film with each of the rasters the optical equivalent of the horizontal sync pulses of the video signals of each of the rasters;

recording on the film with each of the rasters the optical equivalent of the vertical sync pulses of the video signals of each of the rasters;

scanning each of the rasters and the sync pulses recorded with the rasters with a light beam of substantially constant intensity to modulate the intensity of the light beam;

converting the modulated light beam into video signals of the two-dimensional images; and applying the video signals to a video monitor to reproduce the two-dimensional images in a predetermined order.

14. A system for recording on nonmoving photographic film, having an array of sectors, TV video signals having camera signals and sync signals corresponding to images and reproducing from the information recorded on each of the sectors of the film when developed TV video signals corresponding to each of the images recorded in each of the sectors, said system comprising:

a light source for producing a beam of substantially constant intensity;

modulating means for modulating the intensity of said beam;

photographic film having a plurality of sectors forming an array, the size of each sector being such that a raster scan is conducted by said beam in each of said sectors so that an image of a source is recorded in each sector, the position of said photographic film being fixed relative to said source of light during the recording and reproducing of the TV video signals in each of said sectors, said photographic film also being fixed during the positioning of said beam from each of said sectors to the next predetermined sectors on which a raster scan is to be conducted;

positioning means for positioning said modulated beam in predetermined sectors of said photographic film, said positioning means providing a horizontal coordinate signal and a vertical coordinate signal corresponding to one of said plurality of photographic film sectors;

scanning means adapted to be connected to the source of TV video signals for causing said beam to conduct the raster scan of each of said plurality of sectors as determined by said positioning means, said scanning means including a horizontal deflecting signal for controlling movement of said beam in a substantially horizontal direction in each of said sectors and a vertical deflecting signal for controlling movement of said beam in a substantially vertical direction in each of said sectors, said horizontal and vertical deflecting signals being synchronized with TV video horizontal and vertical sync signals, said scanning means being responsive to said positioning means wherein said vertical position of said beam during each of the sector scans is controlled by the sum of said vertical coordinate signal and said vertical deflecting signal while the horizontal position of said beam is controlled by said horizontal deflecting signal;

and a reproducing system of images recorded by the recording system, including:

said beam;

said scanning means;

developed photographic film having a plurality of sectors forming an array and having an image recorded in a form of a raster in each of said sectors;

said positioning means for controlling movement of said unmodulated beam so that said beam conducts a raster scan of each image in each of said predetermined sectors, the intensity of said beam being modulated by the transmissivity of said photographic film; and detector means for converting said modulated beam of light to electrical TV video signals adapted to be applied to a TV monitor to produce in a predetermined sequence a reproduction of each image formed in said sectors, said TV video signals including vertical and horizontal sync signals.

* * * * *